United States Patent

Erdelitsch et al.

Patent Number: 4,648,728
Date of Patent: Mar. 10, 1987

[54] STEERING COLUMN SWITCH FOR MOTOR VEHICLES

[75] Inventors: Herbert Erdelitsch, Bietigheim-Bissingen; Werner Gaudich, Ingersheim; Walter Hecht, Bietigheim-Bissingem, all of Fed. Rep. of Germany

[73] Assignee: SWF Auto-Electric GmbH, Bietigheim-Bissingen, Fed. Rep. of Germany

[21] Appl. No.: 755,924

[22] Filed: Jul. 17, 1985

[30] Foreign Application Priority Data

Jul. 19, 1984 [DE] Fed. Rep. of Germany ....... 3426606

[51] Int. Cl.4 ........................................... F16C 35/077
[52] U.S. Cl. .................................... 384/537; 384/585; 384/903
[58] Field of Search ............... 384/537, 585, 536, 903; 308/DIG. 11

[56] References Cited

U.S. PATENT DOCUMENTS 4,213,660  7/1980  Yasui et al. ......................... 384/585

FOREIGN PATENT DOCUMENTS 1253964  11/1971  United Kingdom ................ 384/585

Primary Examiner—Lenard A. Footland
Attorney, Agent, or Firm—Donald J. Lenkszus

[57] ABSTRACT

A steering column switch for motor vehicles includes a support sleeve, which may be mounted on the end of a steering tube. The sleeve, between an internal collar integrally formed on it and a retaining ring is mounted a ball bearing for a steering spindle and which is made of plastics material. The retaining ring is separated from the support sleeve and held on it via the internal collar.

10 Claims, 3 Drawing Figures

STEERING COLUMN SWITCH FOR MOTOR VEHICLES

BACKGROUND OF THE INVENTION

The invention pertains to a steering column switch for motor vehicles comprising a support sleeve which may be mounted on the end of a steering tube. In the support sleeve there is mounted a bearing, especially a roller bearing, for a steering spindle between an internal collar integrally formed on the said support sleeve and a retaining ring.

A steering column switch of this kind is for example known from the German petty Pat. No. 7,524,815. Switches of this kind are also mounted in motor vehicles presently in production. The support sleeve of these switches is made of zinc die-casting material. A roller bearing in the support sleeve is secured in the axial direction by a support on the internal collar. In the other axial direction in which the roller bearing has to endure very high axial forces it is secured by a retaining ring formed by pressing material of the support sleeve over the front side of the roller bearing.

German specification AS No. 28 28 592 shows a steering column switch with a support sleeve which has been made of plastics material and in which a roller bearing is held as in a metal support sleeve. However the retaining ring of plastics material is not capable of reliably transmitting the high forces onto the support sleeve. High forces have to be taken up by the roller bearing under certain circumstances and there exists the risk that the retaining ring will break. Consequently the roller bearing and steering spindle can be pushed out of the steering tube.

If the support sleeve is made of metal, this risk is smaller, but under certain circumstances the stability might still not be great enough.

SUMMARY OF THE INVENTION

It is one object of the invention to provide a steering column switch in which the seat of the bearing for the steering spindle in the support sleeve can be made more stable and safe.

This problem is solved according to the invention in that the retaining ring is separated from the support sleeve and held by the support sleeve via the internal collar. Thus the bearing is now supported on the support sleeve via the internal collar in both axial directions, because the retaining ring, which now is no longer produced as a single piece with the support sleeve, is held on the support sleeve via the internal collar. The internal collar can endure high axial forces. A retaining ring separated from the support sleeve makes it possible to use a material for this purpose which can also be easily adapted to the forces to be endured.

The support sleeve may be made of a metal, for example, it may be die cast zinc. In some applications the bearing for the steering spindle has its seat quite close to the front side of the support sleeve, so that there is little material available which can be beaded over the bearing. In this case, a separate retaining ring can be made strong enough to hold the bearing on the support sleeve via the internal collar in one axial direction. The retaining ring will be advantageously made of a metal in both applications.

Advantageous embodiments of a steering column switch according to the invention can be provided. In one embodiment the retaining ring is formed on a metal bushing anchored at the internal collar. The bushing may encompass the internal collar with a portion forming an external groove.

To reduce the number of piece parts the bushing maybe formed by the external ring of the roller bearing. If however it is not desirable to use a special bearing but rather a conventional bearing, a separate bushing can be used which is positioned between the bearing and the support sleeve and which has a retaining ring for the bearing.

The support sleeve of a steering column switch according to the invention can be provided with a cleat to prevent twisting as in known steering column switches. The cleat projects somewhat into the interior of the sleeve and can be pushed into a longitudinal slot of the steering tube. So that the shape and the position of the cleat will not be changed because of the bushing, the bushing is recessed in its portion forming the external groove and the cleat projects into this recess.

BRIEF DESCRIPTION OF THE DRAWING

The invention will be better understood from a reading of the following detailed description in conjunction with the drawing in which.

DETAILED DESCRIPTION

Figure 1:
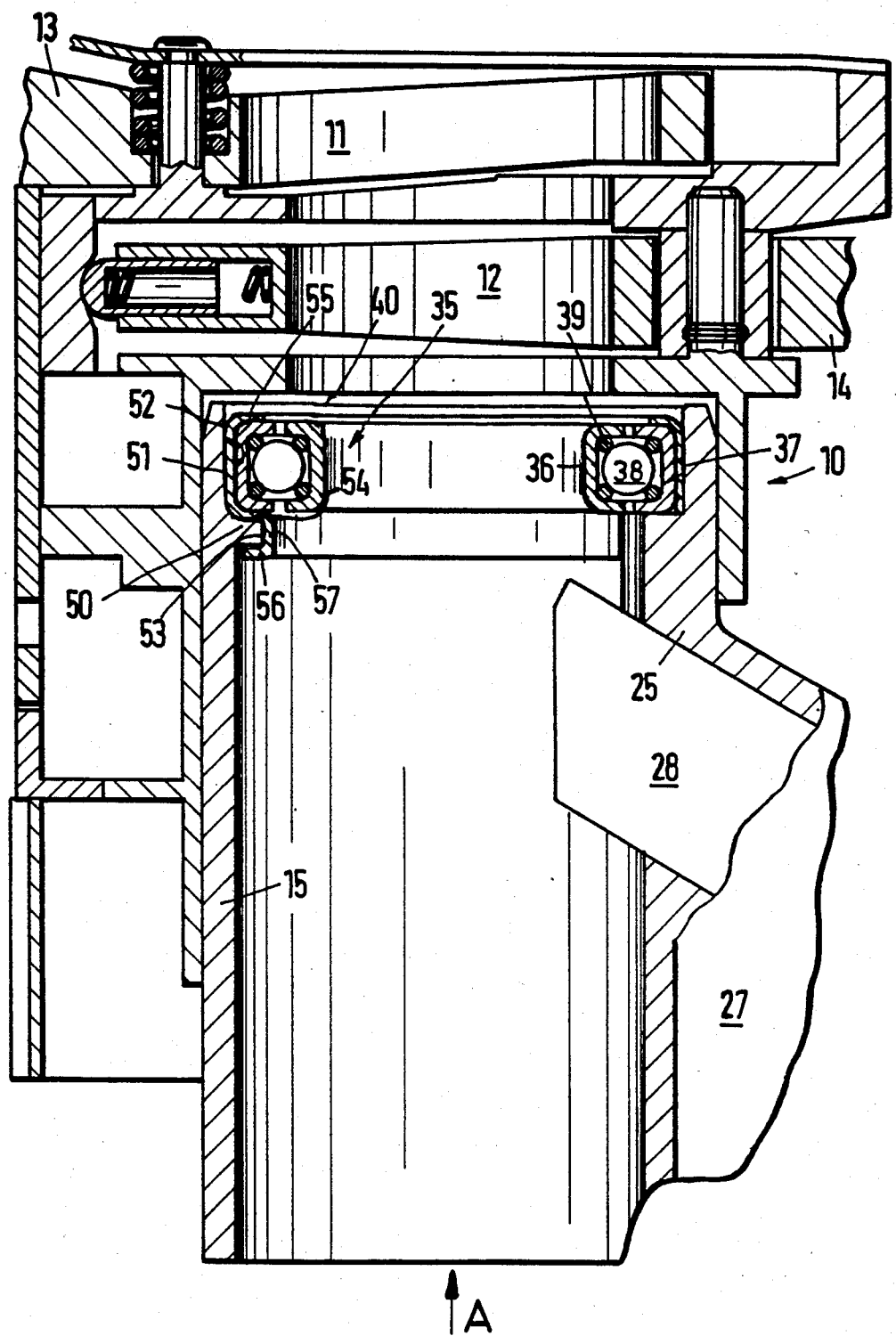
FIG. 1 is a longitudinal section through a first embodiment having a metal bushing between a ball bearing for the steering spindle and the support sleeve of plastics material.

The two steering column switches shown have a housing 10, in which two switching members 11 and 12 are rotatably mounted axially one above the other. Switching members 11 and 12 are integrally formed with switch levers 13 and 14 and which can be moved by them. One switch lever can also be swivelled perpendicularly. Movable and stationary electric contacts (not shown in detail) are accommodated in housing 10 so that the steering column switch can control several electric systems of a motor vehicle, such as the windshield wiper and washer systems, the turn signal indicator, the changeover between high beam and low beam and other things.

The housing 10 is composed of several piece parts. It also comprises a support sleeve 15 which is made of plastics material and by means of which it can be jammed on the steering tube 16 of a steering column only shown in the drawing of FIG. 2. For this purpose the support sleeve is formed as clamp which has two wing-shaped studs 17. A lug 18 welded on the steering tube 16 projects between studs 17. To secure the support sleeve 15 on the steering tube 16 the two studs 27 can be drawn together by a screw 19. Thus after the assembly the support sleeve 15 surrounds the steering tube 16.

Towards the interior a cleat 25 which prevents twisting is formed on the support sleeve. Cleat 25 extends in the longitudinal direction of the sleeve and is inserted in a longitudinal slot 26 of the steering tube 16. Integrally connected with the support sleeve 15 in the area of cleat 25 is a hollow cylinder 27 extending at an acute angle to the axis of the sleeve. Cylinder 27 receives the functional parts of the steering lock and the ignition starter switch. Locking bolt 28 of the steering lock is shown in its locking position in the Figures of the drawing and can be withdrawn from the interior of the support sleeve 15 by actuation of the steering lock.

A ball bearing 35 is premounted in support sleeve 15. After mounting of one of the shown steering column switches in a motor vehicle, ball bearing 35 is positioned between the support sleeve 15 and the steering spindle extending in its interior. The ball bearing 35 includes an internal ring 36, an external ring 37, balls 38 and of four wire race rings 39. Thus the ball bearing 39 must be secured in the support sleeve in such a way that it is reliably held in the axial direction. In the direction toward the switching members 11 and 12, i.e., in the direction toward the steering wheel, the fastening of the ball bearing 35 must be capable of enduring high pullout forces. In the axial direction the ball bearing 35 must be seated close to the front side 40 of the support sleeve 15 facing the switching members 11 and 12. To secure the ball bearing 35, support sleeve 15 has an internal collar 50 in both embodiments which is somewhat farther away from the front side 40 than the amount of the axial extension of the ball bearing 35 and, outside cleat 25 extends over the entire internal circumference of the support sleeve 15. In the steering column switches according to the invention the internal collar 50 is used together with a metal bushing 51 or 37 to anchor the ball bearing at the support sleeve in both opposite axial directions.

Figure 2:
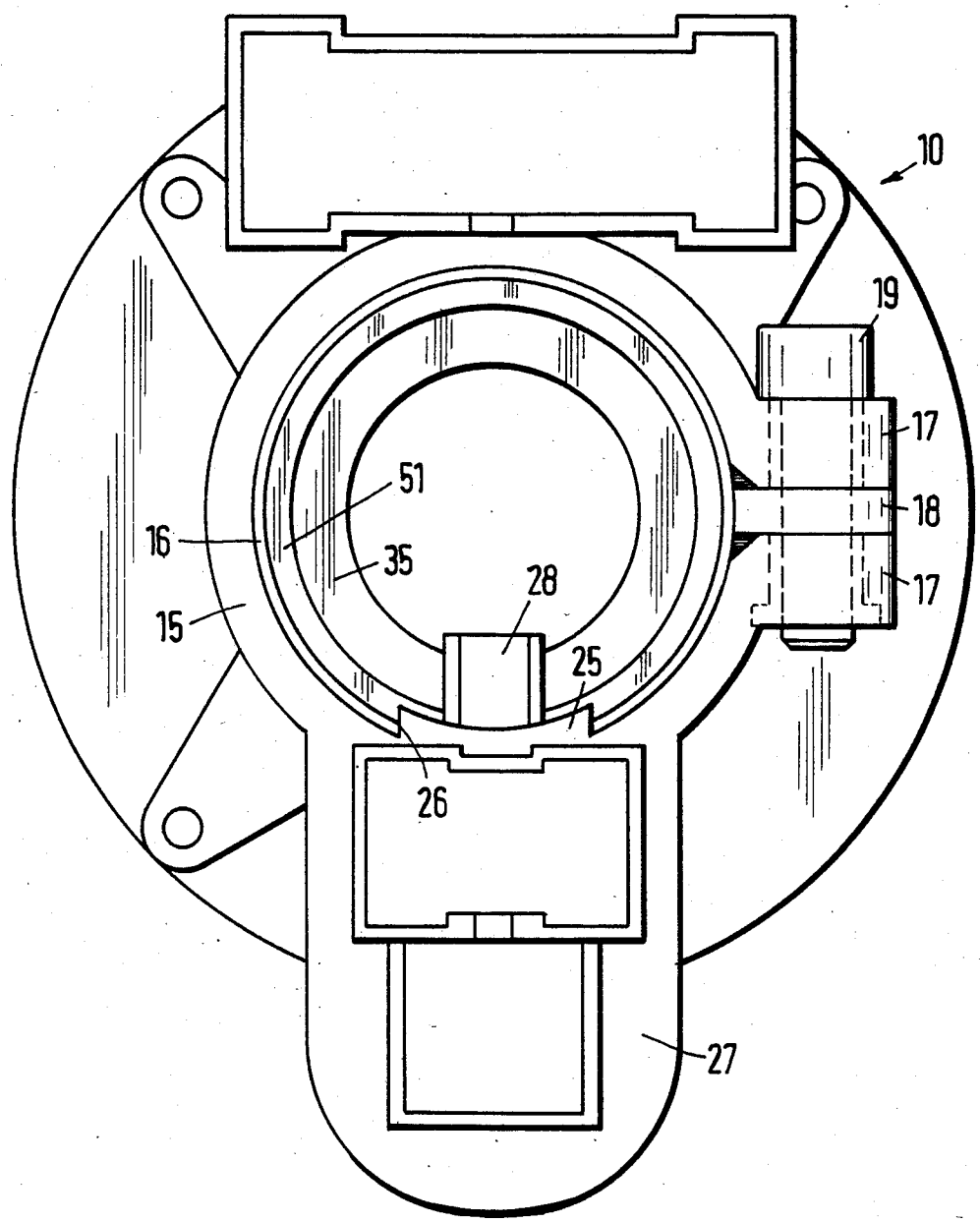
FIG. 2 is a view of the steering column switch of FIG. 1 in the direction of arrow A and FIG. 3 is a longitudinal section through a second embodiment, in which the external ring of the ball bearing is anchored at the internal collar of the support sleeve.

The metal bushing 51 of the embodiment according to FIGS. 1 and 2 is available in addition to the support sleeve 15 and to the piece parts of the ball bearing 35.

Bushing 51 is substantially positioned between the external ring 37 of the ball bearing and the support sleeve 15. Metal bushing 51 is bent in the shape of a meander and forms an internal groove 52 and an external groove 53. Internal groove 52, has a width corresponding to the axial extension of the ball bearing 35 and which encompasses the external ring 37 of the ball bearing 35. External groove 53, has a width corresponding to the axial thickness of the internal collar 50 and encompasses the internal collar 50.

If axial forces act upon the ball bearing 35 in the direction away from the switching members 11 and 12, the ball bearing is supported on the internal collar 50 and thus on the sleeve 15 via the joint portion 54 of the internal groove 52 and the external groove 53 of the metal bushing 51. If the ball bearing is loaded in the opposite axial direction it is supported on portion 55 of the metal bushing 51. Portion 55 is positioned in a horizontal plane close to the front side 40 of the support sleeve 15. The metal bushing transmits the force again to the internal collar 50 and thus to the support sleeve 15. Thus portion 55 of metal bushing 51 forms the retaining ring for the ball bearing 35.

The metal bushing 51 as a half-finished product is produced in such a way that at first it only has two axial portions with different diameters and the horizontal portion 54 connecting the two axial portions. Then the ball bearing 35 can be inserted in the bushing 51 and the retaining ring 55 can be inwardly bent from the one axial portion. Metal bushing 51 and ball bearing 35 are now firmly connected with each other. Then these two parts can together be pushed into the support sleeve 15 as far as collar 50. Thereafter portion 56 of the other axial portion is bent behind the internal collar 50. Another mounting possibility is to insert metal bushing and ball bearing in the support sleeve 15 at first and thereafter bend the portions 55 and 56.

In the area of cleat 25 the metal bushing 51 has a recess in its portions 54, 56, and 57 forming the external groove 53, so that cleat 25 can extend to the ball bearing 35 and the latter rests upon the cleat 25 preventing twisting there.

Figure 3:
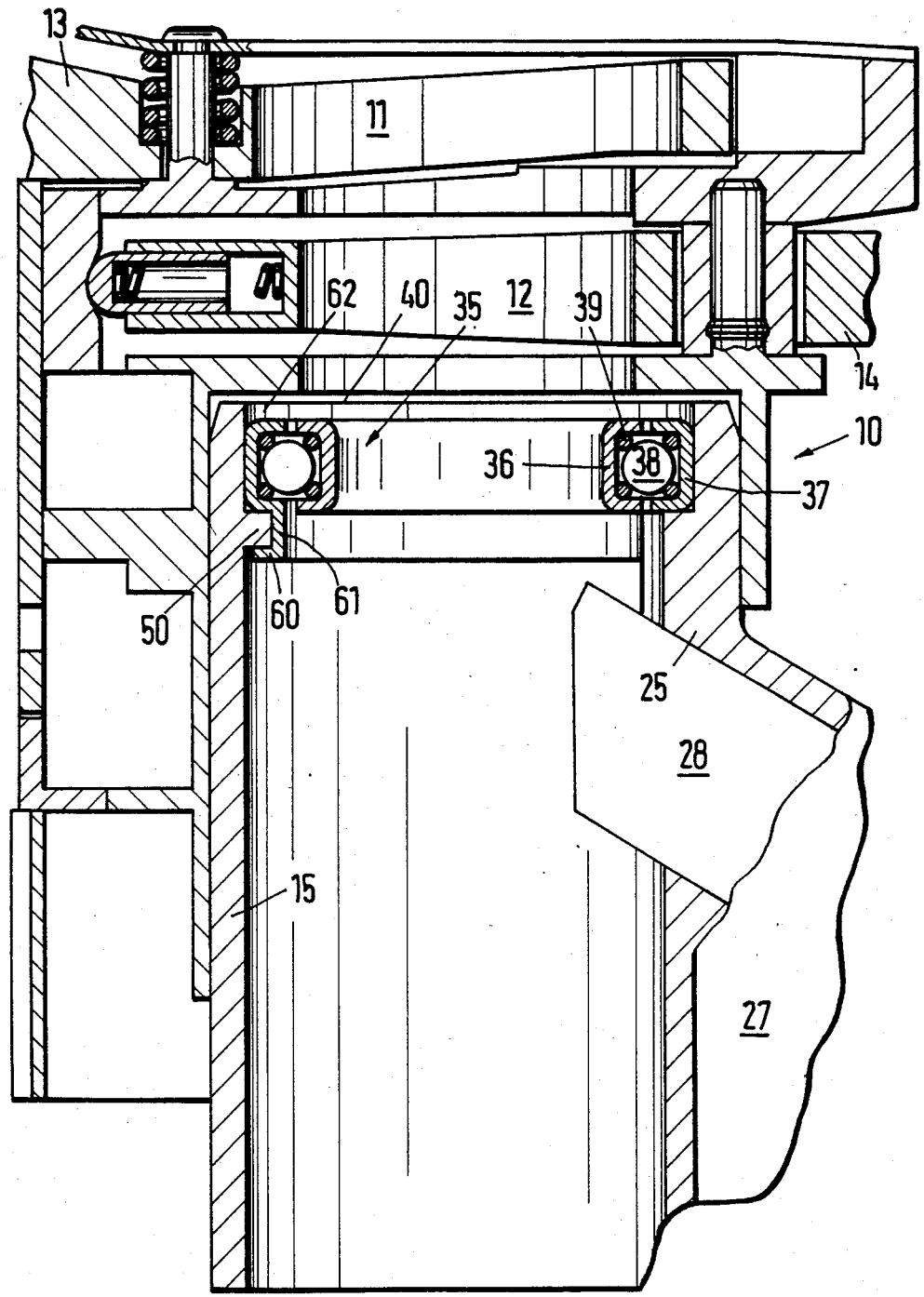

In the embodiment of FIG. 3 the external ring of the ball bearing is additionally provided with two portions 60 and 61 corresponding to the portions 56 and 57 of the metal bushing 51 in FIGS. 1 and 2 and thereby encompasses the internal collar 50. In the embodiment according to FIG. 3 the internal collar 50 is thicker than that of the embodiment according to FIGS. 1 and 2 because in the axial direction there is no part between the external ring 37 and the internal collar 50. Thus ball bearing 35 occupies the same axial position in both embodiments. A retaining ring 62 for the ball bearing 35 is formed by the horizontal portion of the external ring 37 which portion is adjacent to the front face 40 of the support sleeve 15.

What is claimed is:

1. A steering column switch for motor vehicles, comprising:
    a support sleeve of plastic material which maybe mounted on the end of a steering tube;
    an internal collar integrally formed on said sleeve and extending radially inward;
    a retaining ring formed separately from said support sleeve and disposed within said support sleeve said retaining ring engaging said internal collar whereby said internal collar prevents axial movement of said retaining ring in both directions along the axis of said sleeve, and
    a rolling bearing for a steering spindle, said bearing being mounted within said sleeve and retained between said collar and one end of said retaining ring.

2. A steering column switch for motor vehicles in accordance with claim 1, comprising:
    a metal bushing anchored on said internal collar, said retaining ring being formed on said metal bushing.

3. A steering column switch for motor vehicles in accordance with claim 2 wherein:
    said bushing includes portions forming a groove, said groove encompassing said internal collar.

4. A steering column switch in accordance with claim 3, wherein:
    said bushing is formed by the external ring of said roller bearing.

5. A steering column switch in accordance with claim 3, wherein:
    said bushing is positioned between said bearing and said support sleeve, and collar said bushing having integrally formed thereon said retaining ring for said bearing.

6. A steering column switch in accordance with claim 3, wherein:
    said bushing in its portions forming said groove has a recess;
    said support sleeve comprising a cleat projecting into said recess.

7. A steering column switch in accordance with claim 6, wherein:
    in the area of said recess said bearing rests upon said cleat.

8. A steering column switch in accordance with claim 2, wherein:
said bushing is formed by the external ring of said roller bearing.

9. A steering column switch in accordance with claim 2, wherein:
said bushing is positioned between said bearing and said support sleeve, and said bushing having integrally formed thereon said retaining ring for said bearing.

10. A steering column switch in accordance with claim 2, wherein:
said bushing is meander-shaped in the axial direction and has a first portion forming said retaining ring and at least substantially positioned in a horizontal plane, a second portion adjoining in the axial direction and being positioned between support sleeve and bearing, a third portion positioned at least substantially horizontally between said bearing and said internal collar, an axial fourth portion in front of the internal surface of said internal collar and a fifth portion gripping behind said internal collar.

* * * * *